No. 858,585. PATENTED JULY 2, 1907.
A. DOW.
TYPE SETTING MACHINE.
APPLICATION FILED NOV. 18, 1904.

Inventor
A. Dow
By Stuart & Stuart
Attorneys

Witnesses
Jn Imre
W. W. Williams

No. 858,585. PATENTED JULY 2, 1907.
A. DOW.
TYPE SETTING MACHINE.
APPLICATION FILED NOV. 18, 1904.

UNITED STATES PATENT OFFICE.

ALEXANDER DOW, OF NEW YORK, N. Y., ASSIGNOR TO DOW COMPOSING MACHINE COMPANY OF NEW YORK, OF NEW YORK, N. Y., A CORPORATION OF NEW YORK.

TYPE-SETTING MACHINE.

No. 858,585.      Specification of Letters Patent.      Patented July 2, 1907.

Application filed November 18, 1904. Serial No. 233,333.

*To all whom it may concern:*

Be it known that I, ALEXANDER DOW, a citizen of the United States of America, and a resident of New York, county of New York, State of New York, have invented certain new and useful Improvements in Type-Setting Machines, of which the following is a specification.

My invention relates to an improvement in that class of type setting machines in which the type are arranged in a series of channels from which they are fed by a mechanism to positions where the various characters comprising the font may be readily removed by the compositor and placed in a stick for composition. The type in the channels of the machine lie with their nicks, similarly disposed, and their faces in one direction and are ejected by the mechanism one by one into a position convenient for the compositor. Thus it will be seen that a compositor is able to compose matter a great deal more rapidly than is possible from the ordinary case in which the type lie loosely, because the compositor not only has to select the proper type, but also has to arrange the same to bring the faces outward and cause the nicks to lie in one direction when they are placed in his stick.

The object of my invention is to provide for a rapid and easy selection of the type, the type being presented in position to be selected one at a time, and I also provide means whereby as soon as a type is selected another type is ejected from the channel corresponding to the type selected, to take its place, consequently, there will always be a single type of each character in proper position to be readily selected by the compositor. In order that the type may be readily removed from the machine, I provide means by which each character is loosely held upon a table and yet held under such conditions that it is prevented from being moved from its position except by the removal thereof by the compositor.

For the purpose of illustrating my invention, reference is had to the accompanying drawings and the following description, wherein I show and describe the preferred mechanical embodiment of my invention. I desire to have it understood, however, that my invention is not to be limited to the constructions shown and described, as many changes may be made in the form, construction and arrangement of parts and the particular mechanism employed without departing from my invention.

References to the drawings, wherein the same part is designated by the same reference numeral wherever it occurs.

Figure 1:
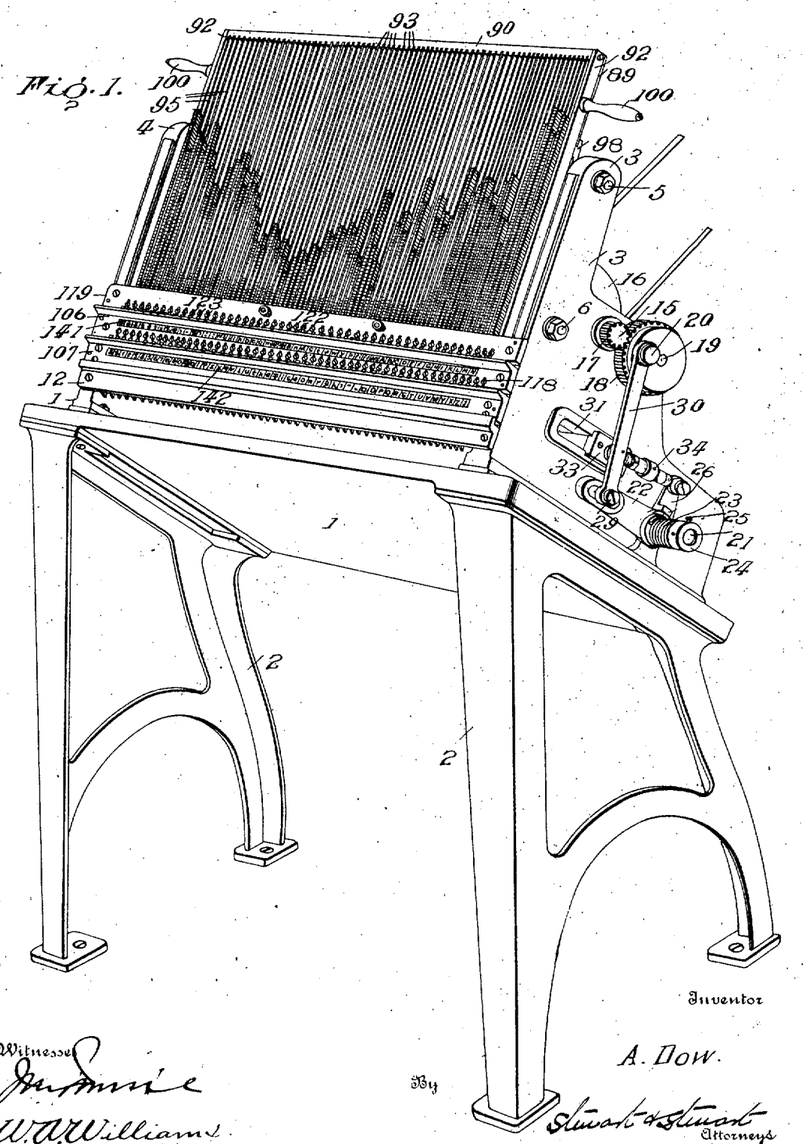
Figure 1 is a perspective view of the machine.
Figure 2:
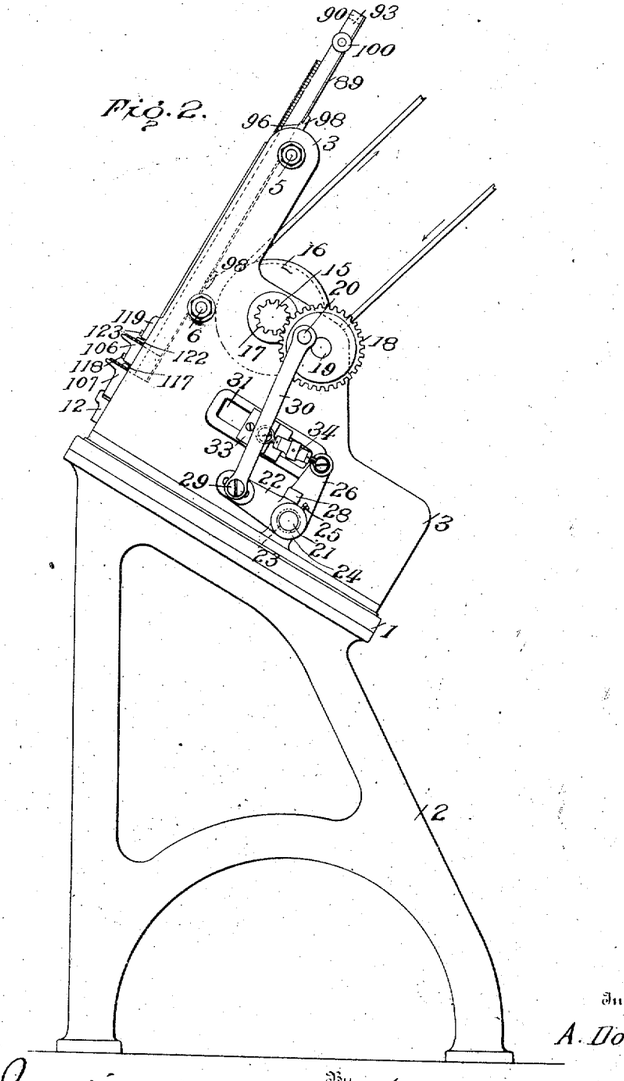
Fig. 2 is a side elevation.
Figure 3:
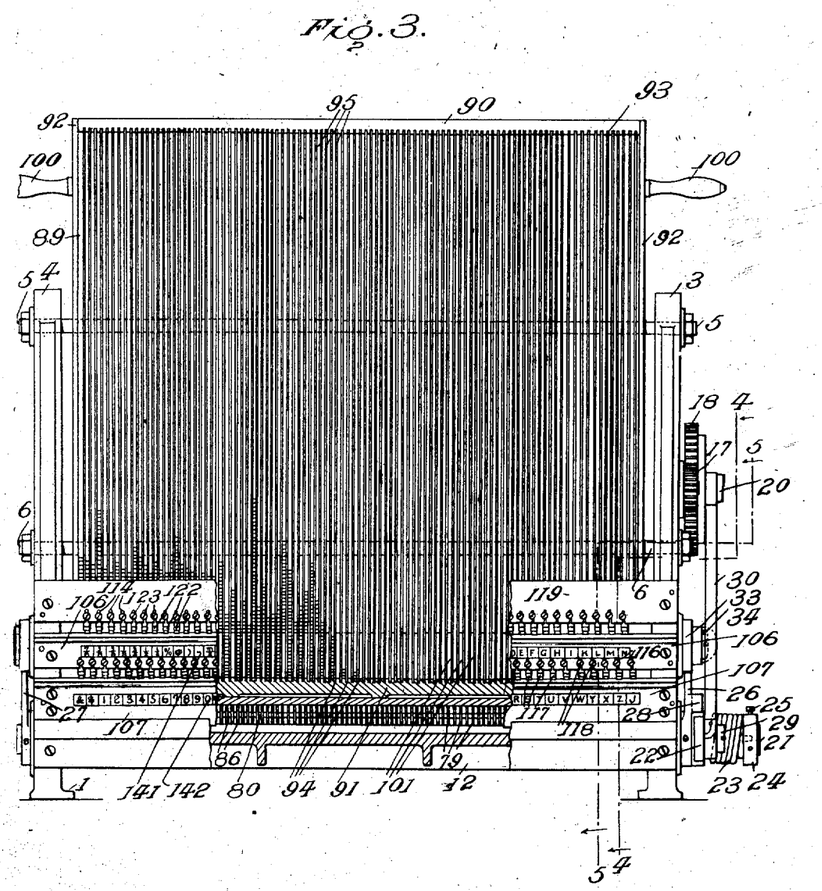
Fig. 3 is a front view partly broken away to more clearly show the construction.

1 designates the bed of the machine which is suitably supported by the legs 2. Preferably the bed 1 is supporetd in an inclined position as is shown in Fig. 1, so that the mechanism supported on the bed is tilted backwards from the operator. Extending up from the bed 1 are the side frames 3—4. These side frames are connected together by means of the stay bolts 5 and 6.

Extending between the frames and supported thereby are the cover 7 and the transverse frames 8, 9, 10, 11 and 12. The transverse frames 8 and 9 are located one above the other at the rear portion of the side frames and the frames 10, 11 and 12 are located over each other near the front of the side frames. These frames support the type ejecting mechanism and the front portion of the frame 11 is provided with a shoulder 13 on which the bottom of the type case 14 to be hereafter described rests. These frames are all shown in cross-section in Figs. 4 and 5.

15 is a power shaft mounted in a suitable bearing in the side frame 3 and is provided with a driving pulley 16 on the inside of the frame and a gear 17 on the outside of the frame.

18 is a gear wheel on a shaft 19 in the side frame 3 and this gear wheel is provided with a crank pin 20.

21 is a rock shaft journaled in the lower portion of the side frames 3 and 4 and on one end of this shaft is loosely mounted an arm 22.

23 is a spring encircling the shaft 21 outside the arm 22, one end of the spring being secured to the hub of the arm 22 and the other end to a collar 24 loose on the shaft 21 and adapted to be secured thereto by means of the set screw 25. It will be seen that by adjusting the position of the collar 24 on the shaft 21 with relation to the arm 22, that the tension of the spring 23 can be adjusted.

26 is an arm secured to the shaft 21 just outside the frame 3, and 27 is a second arm secured to the shaft 21 just outside the frame 4. The arm 26 is provided with a lug 28 which projects out over the side thereof from the arm 22.

In the free end of arm 22 is located a slot in which is adjustably mounted a pin 29. Connecting this pin 29 and the crank pin 20 is a connecting link 30. From this construction, it will be seen that at each revolution of gear 18, shaft 21 will be oscillated an amount dependent upon the adjustment of the pin 29 of the slot. Because the shaft 21 is connected to the arm 22 through the medium of the spring, it will be oscillated in a direction to move the arms 26 and 27 toward the front of the machine elastically. Consequently, should these arms in their forward movement meet with any abnormal resistance, the connection between the shaft and the arm 22 will yield and avoid breakage of the parts. The arms 26 and 27, positively move toward the rear of the machine, because the shaft 21 is positively operated through the contact between the lug 28 of the arm 26 and the side of the arm 22.

31 are rectangular slots cut in the sides of the frames 3 and 4 and in line with each other. Extending between these slots and mounted for reciprocation therein is a bar 32. This bar in central cross-section is of the form of an "I" bar, as shown for instance in Fig. 4. At its ends, however, its cross-section is rectangular and of a width to fit the slots 31.

To the end of the bar, outside of the frames are secured the plates 33, the plates being wider than the width of the slots 31 whereby the bar will be held in the slots and prevented from endwise movement.

34 are turn-buckles of ordinary construction, one end of each is connected with the arms 26 and 27 and the other ends of the turn-buckles are connected to the plates 33 of the bar 32. Thus at each rotation of the gear 18 the bar 32 will be given a complete reciprocation.

The mechanism which I have just described, forms what I term an actuating mechanism for the type ejecting means and while the form shown and described is the preferred form, it is not essential that it be constructed in this manner as any other form of mechanism to accomplish the result might be substituted for that shown and described.

In the form of my invention shown, the machine is provided with two sets of forcers, an upper set and a lower set, to which I will now refer. Extending upwardly from the front end of the top portion of the frame 8 is the projection 35 which is provided with a series of transverse slots 36. The top of the frame 10 is formed of series of steps, the steps running transversely of the frame, with the highest step 37 at the back portion of the frame and the step 38 being between the step 37 and the lowest step 39.

40 are slots which extend transversely across the top of the frame 10 through the steps 37, 38 and 39 in line with the slots 36 in the projection 35. The bottom of these slots 40 is on the same level all the way across the frame and consequently, the slots will be deepest in the portion 37 and shallowest in the portion 39.

41 are the upper set of forcer blades which are mounted in the slots 36 and 40 and are adapted to be reciprocated therein.

The cover 7 is provided at its rear with a portion 42 which rests upon the top of the projection 35 and closes the slots 36. The cover is also provided with a portion 43 which covers the slots in the highest step 37, and a portion 44 which covers the slots in the lowest portion 39, thus securely holds the forcers in position.

The frame 9 on its upper portion is provided with a slightly raised bearing surface 45 and depending from the front portion of the upper frame 8 is a transverse projection 46 which is provided with a series of slots 47, these slots being located in planes midway between the planes of the slots 36 in the upper bar 35. The frame 11 has its upper surface formed into the transverse steps 48 and 49 and 50, similar to the steps 37, 38 and 39 above described and the top of the frame is also provided with the transverse slots 51, similar to the slots 40 of the upper frame. These slots 51 are in line with the slots 49 in the bar 46 and in these two sets of slots are mounted the lower series of forcers 52, the forcers being held in the slots 47 in the bar 46 by means of the bearing surface 45 of the frame 9, while the front ends of the forcers are held in the slots 51 by the depending portions 53 and 54 of the frame 10. Each of these forcers is preferably, and as shown, composed of two parts, the forcer blade proper which I have numbered 41 and 52, each blade being provided at its front end with a notch 55 and into which extends the projection 56 of what I term the forcer tip 57. This forcer tip is of such a width that it will eject a single type from the type case 14 in a manner to be hereinafter described. It is evident that by having the tips separate from the blades, that should a tip become broken, a new tip could be readily substituted.

It will be noticed that in the form of construction in which I have illustrated my invention, the bar 32 of the actuating mechanism reciprocates between the two sets of forcers, and in order to operate a forcer, it is necessary to have a part which will connect the forcer with the actuating mechanism. In the form of my invention shown, I accomplish this by providing each of the forcers of each set with a pawl 58 pivoted at 59 to the forcer. Each of the pawls is provided with a projection 60, the projection 60 on the pawls of the upper series of forcers extend upwardly above the forcers, whereas the projection 60 of the pawls of the lower series of forcers extend downwardly below the forcers.

Figure 5:
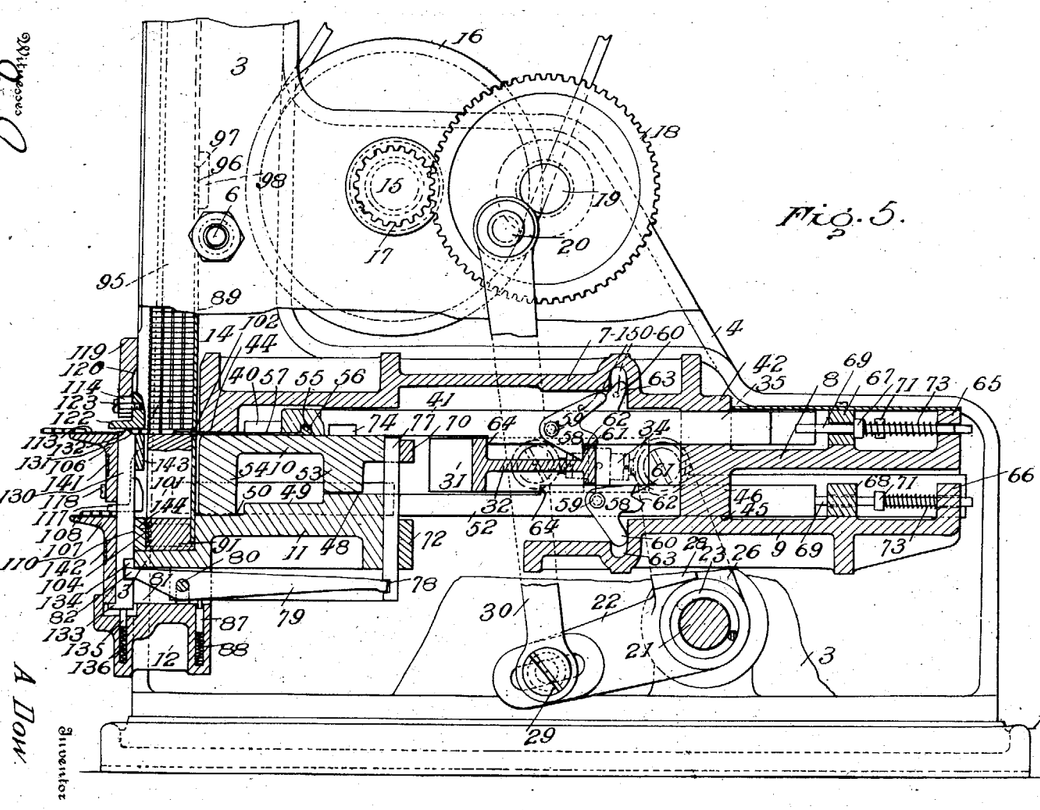
Fig. 5 is a sectional view taken on line 5—5 of Fig. 3, showing an upper forcer as ejecting a type.

61 is an engaging portion of the pawl which is adapted to be moved into the path of movement of the bar 32, as best shown in Fig. 5.

62 is a shoulder formed on the pawl adapted to engage the bar 32 and limit the movement of the pawl toward the bar.

Each of the pawls on the upper series of forcers are provided with a pin 150 projecting over the edge of the forcer to which the pawl is attached for the purpose of limiting its downward movement, should the pawl drop at a time when the bar is not in position to be engaged. On the under sides of the forcers 41 and on the upper side of the forcers 52, I form shoulders 64 which are adapted to be engaged by the bar 32 when the forcers have been moved forward to eject a type to return the forcers as will hereinafter more fully appear. As a means for effecting the initial movement of the forcers, I provide at the rear ends of the frames 8 and 9, the projections 65 and 66. Between these projections and the forcers, I locate the bars 67 and 68 which in the form of my invention shown, are suitably secured to the frames 8 and 9. Through the bar end projection of each frame are bored a series of holes in line with the forcers. In these holes, I place the sets of pins 69 provided with the collars 71 and between the collars and the projections 65 and 66, I place springs 73. The inner ends of the pins rest against the rear ends of the forcers and because of the springs, these pins constantly tend to force the forcers forward so that the pawls will move into the path of the reciprocating bar 32. In order to hold the forcers in their retracted position against the action of the springs 73, I provided the upper set of forcers with a series of notches 74 and the lower set of forcers with a similar series of notches 74, with which co-act a series of locks which I will now describe.

75 are a series of slots cut in the rear face of the frame 10 in line with the slots 40 in which the forcers are mounted and 76 are a series of slots cut in the back of the frame 11 in line with the slots 75. In these slots are mounted the locking bars 77 which engage the notches 74 of the upper set of forcers when the forcers are in their rearward position and hold the forcers against the tension of the springs 73 of the pins 69.

78 is a notch cut near the lower end of each of the bars 77.

79 are a series of levers pivoted on a rod 80 in the slots 81 cut in the lower portion of the frame 11. The inner end of each of the levers 79 engages the notch 78 of the locking pin 77, consequently, when the end 82 of one of these levers is moved upwardly by means to be hereinafter described, the corresponding bar 77 will be withdrawn from its notch 74.

Figure 4:
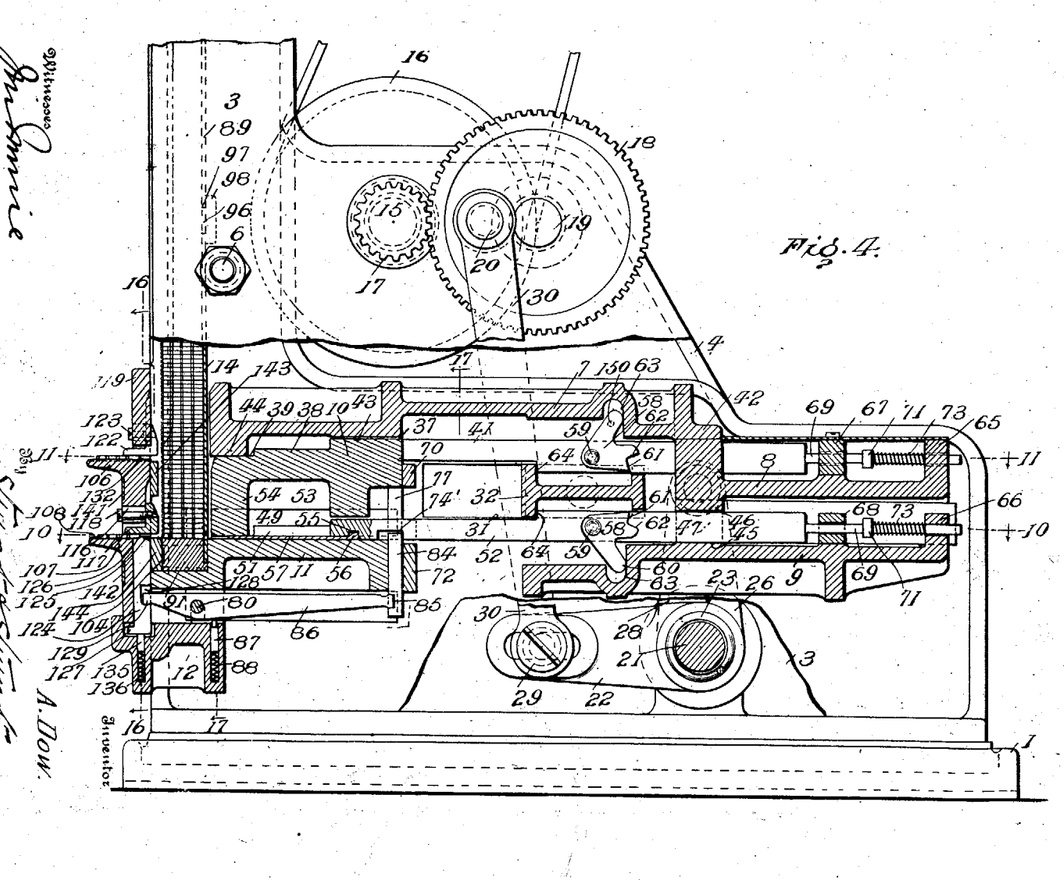
Fig. 4 is a sectional view taken on line 4—4 of Fig. 3.

Cut in the back portion of the frame 11 between the slots 76, are the slots 83, these slots being in the same plane as the grooves 51 cut in the top surface of the frame. In these slots, I mount a series of locking bars 84, similar to the bars 77 and adapted to engage the notches 74' in the lower set of forcer blades 52 when these blades are in their rear most position as shown in Figs. 4 and 5. The lower ends of these bars are provided the notches 85 similar to the notches 78 of the bars 77 and engaging these notches are a series of levers 86, similar to the levers 79 and also fulcrumed on the rod 80 in the slots 81.

87 are a series of pins located under each of the levers 86 and 79 and pressed upwardly by the springs 88 which tend to hold the levers in the position shown in Fig. 4 with the locking bars 84 and 77 in engagement with the notches 74 of the forcers. In order to hold the bars 77 in their slots, I secure to the back of the frame 10, a bar 70 which forms a cover for the slots. 72 is a bar similar to the bar 70 which closes the slots in the rear of the frame 11 and thus holds the locking bars therein.

Thus it will be seen that these locks normally hold the forcers in a position shown in Fig. 4 with the springs 73 under tension and that as soon as a lock is withdrawn by its lever being operated in a manner to be hereinafter described, the spring 73 acting on the forcer can exert its force and move the forcer forward sufficiently to cause its pawl to move into the path of the reciprocating bar 32.

The type case 14 which has been before referred to, consists of a back portion 89, an upper end 90, a lower end 91, and side portions 92—92. The upper and lower ends 91 and 92 of the type case are provided with a series of grooves 93—94 in line with each other, in which are inserted the ends of a series of strips 95, these strips forming the sides of the type channels. As it is preferable to make these channels quite long in order that they may hold a large number of type, I provide means for holding these strips between their ends. In the form of construction shown, such means consists of a projection 96 formed on the back of each strip and adapted to project into the grooves 97 formed in a projecting portion of a strip 98, secured to the back of the case. The back portion 89 of the case is cut out at 99 to allow the projections 98 to extend into the slots 97. By this means, it will be seen that the strips 95 are held the proper distance apart for their whole length. In order to provide means for easily handling the type case, I mount on the sides of the same the handles 100 by means of which the case can be lifted out of the machine to be re-filled or for any other purpose when desired.

In the form of machine shown, the type are ejected at two levels by the forcers and it is therefore necessary to hold one half of the type at one level and the other half at the other. In order to accomplish this result, I place the blocks 101 in alternate channels whereby the type in one channel are at the upper level and in the next channel at the lower level. The strips are placed in the channel so that the channels in which the type are held at the upper level will be in line with the forcers of the upper series and the type of the lower level in line with the forcers of the lower series. By this means, I am able to make the machine very compact, with the type held in the channels close together, yet when in position to be removed by the compositor are far enough apart to prevent interference.

102 and 103 are openings bored in the back 89 of the case in line with the forcers, the openings 102 being located just above the top of the blocks 101 and the openings 103 being located just above the base 91. It is through these openings that the forcers enter the type channels to eject the type therefrom and because of their position, they will eject the bottom type in each channel.

104 is a strip preferably secured in a slot 105 in the lower portion 91 and on this strip are printed the characters composing a font, whereby when the strip is placed in the groove, it will appear under the channels and show the kind of type to be placed in each groove of the case. The type case is supported in the machine by its lower end 91 resting upon the shoulder 13 formed on the frame 11 with the back of the case resting against the stay bolts 5 and 6.

Figure 6:
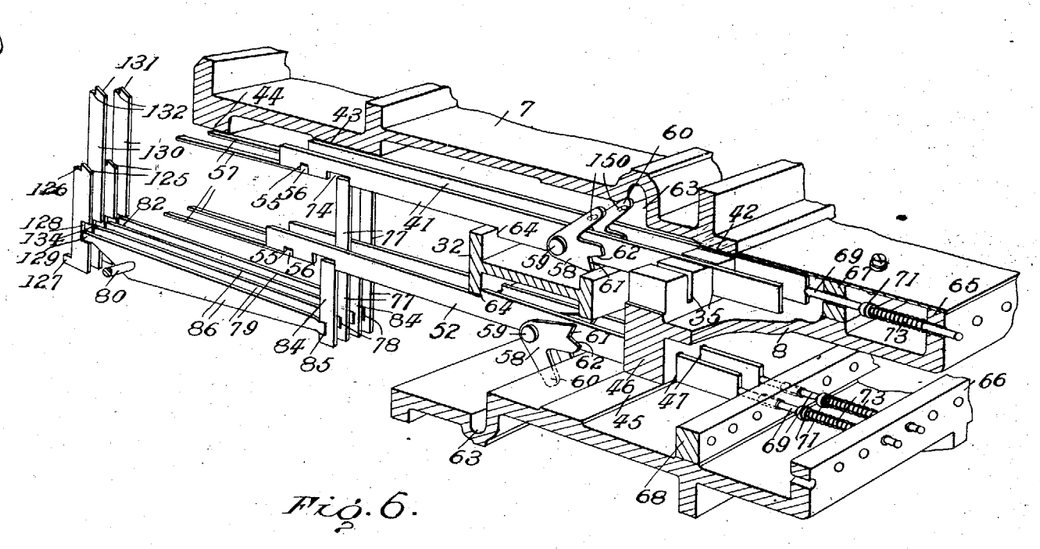
Fig. 6 is a sectional diagrammatic view of the ejector operating mechanism and its controlling mechanism.
Figure 7:
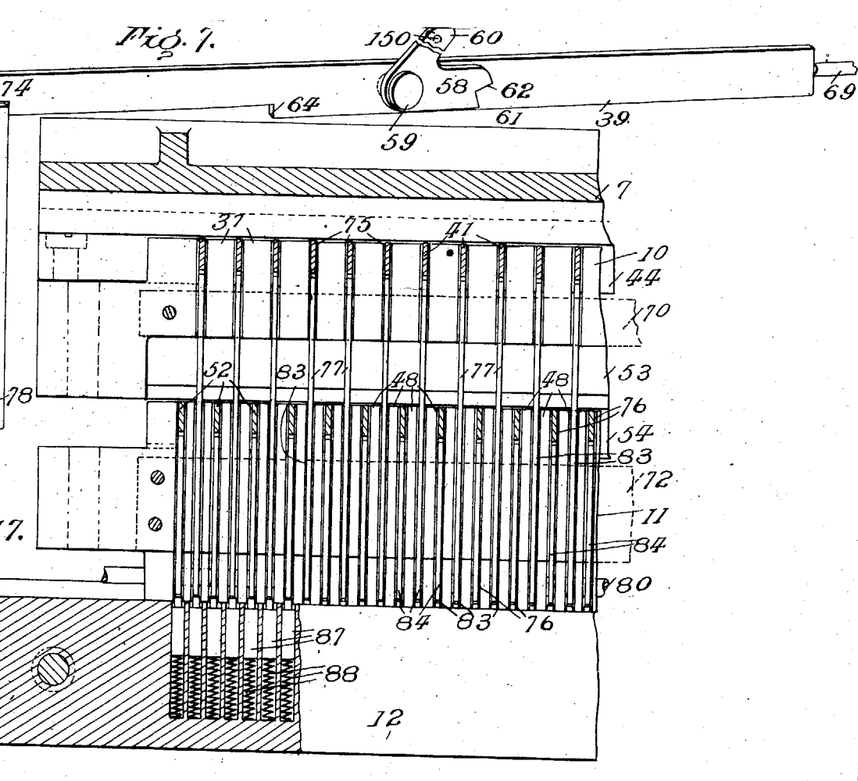
Fig. 7 is a detailed perspective view of an upper forcer and its lock.
Figures 8, 17:
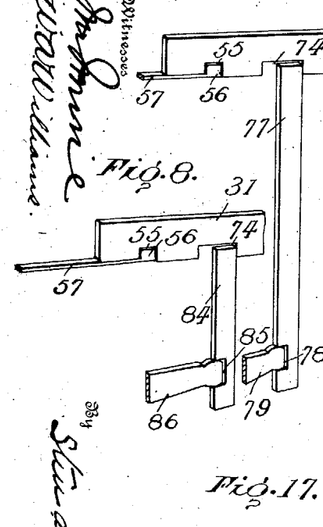
Fig. 8 is a detailed perspective view of the front portion of a lower forcer and its lock.
Fig. 17 is a section taken on line 17—17 of Fig. 4.
Figure 9:
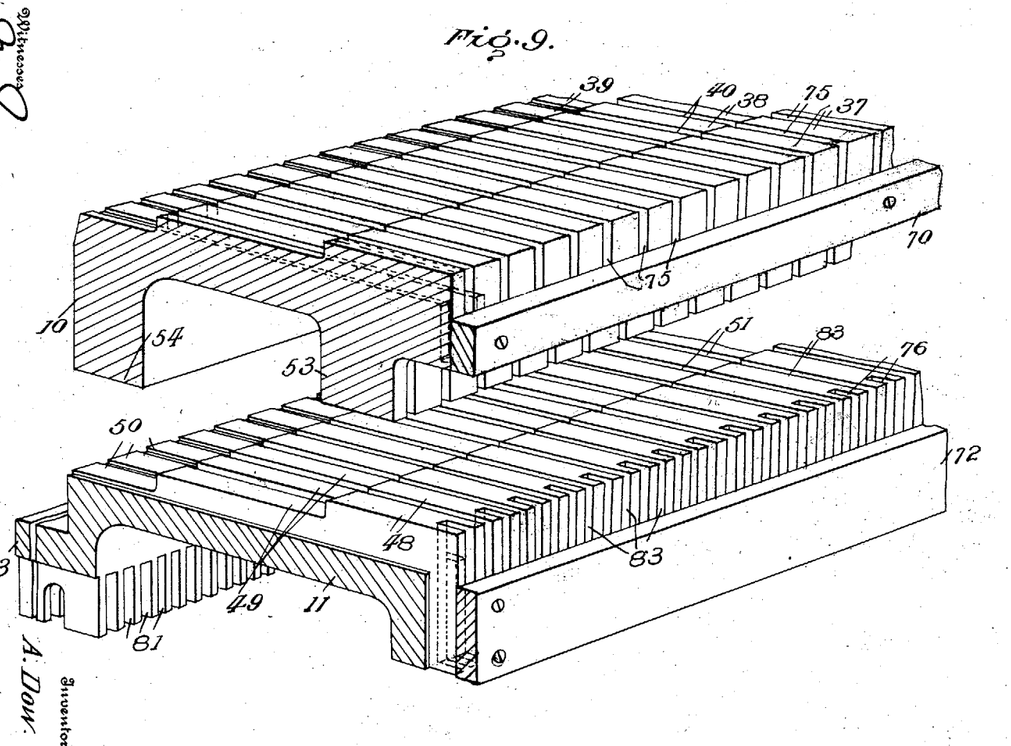
Fig. 9 is a perspective view of two of the frames showing them in their relative position.
Figure 10:
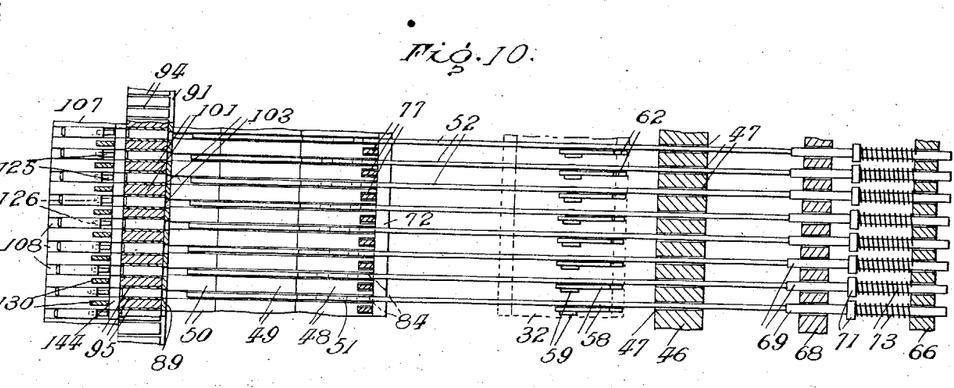
Fig. 10 is a sectional view taken on line 10—10 of Fig. 4.
Figure 11:
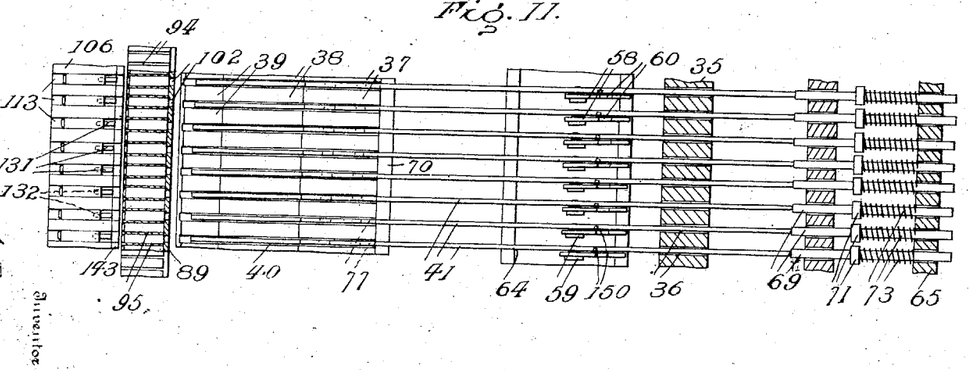
Fig. 11 is a sectional view taken on line 11—11 of Fig. 4.
Figures 12, 13:
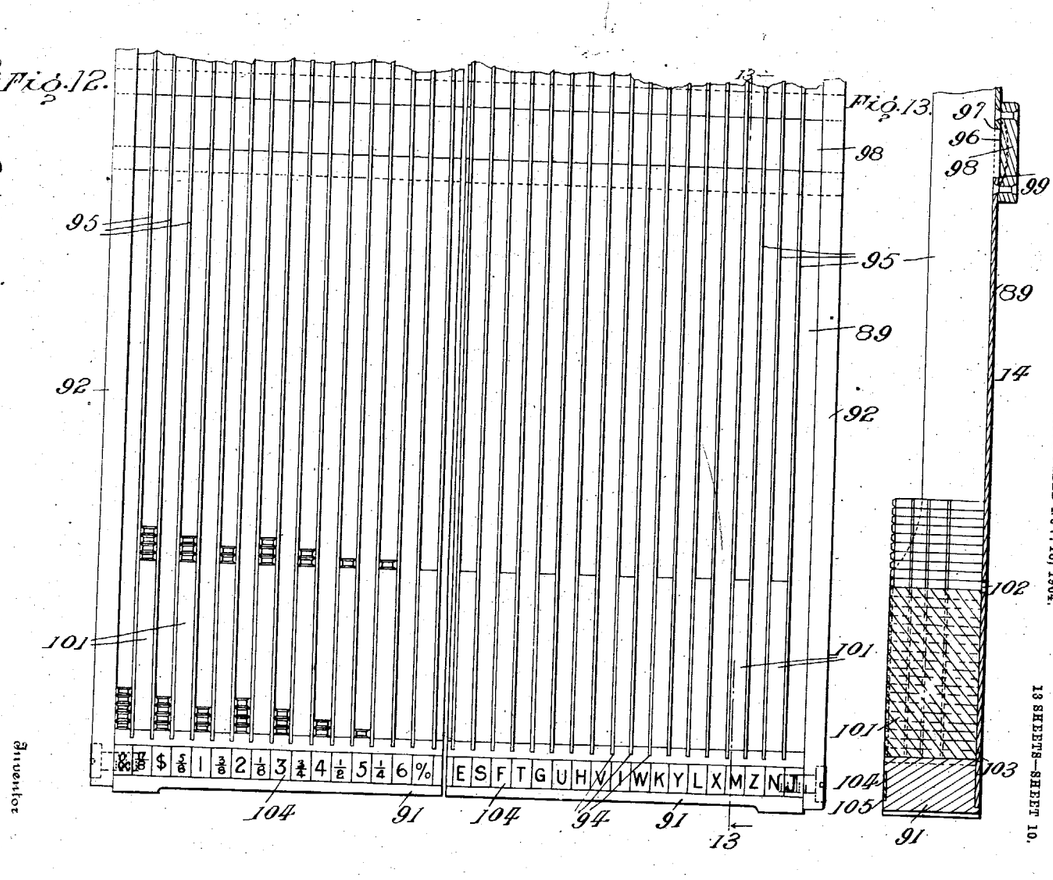
Fig. 12 is a front elevation of the lower portion of the type case.
Fig. 13 is a sectional view of the type case taken on line 13—13 of Fig. 12.
Figure 14:
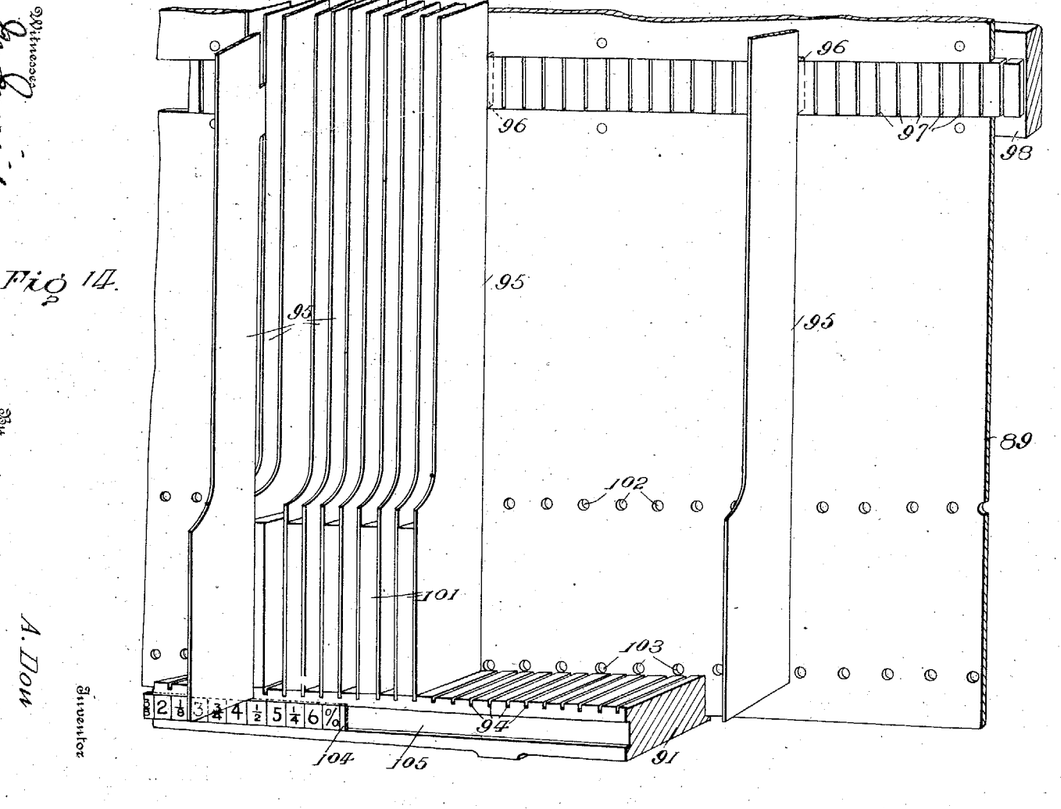
Fig. 14 is a perspective view of the type case with some parts removed, some parts broken away and some in section to more clearly show the construction.
Figure 15:
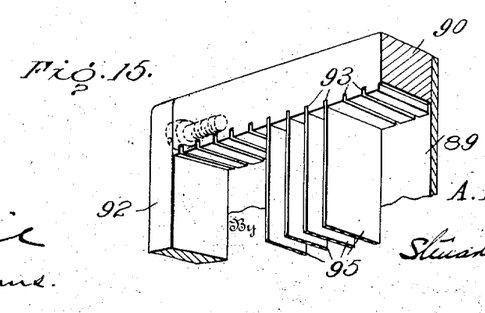
Fig. 15 is a detailed perspective view with parts removed of the upper corner of the type case.
Figures 16, 18, 19:
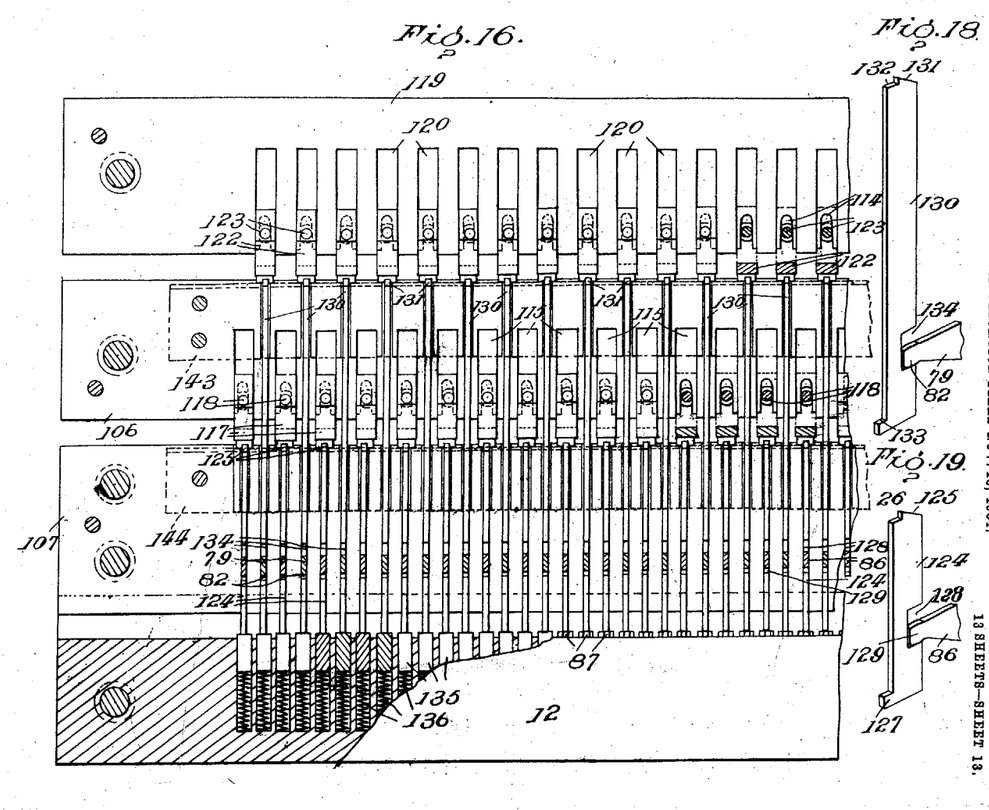
Fig. 16 is a section taken on line 16—16 of Fig. 4.
Fig. 18 is a detailed perspective view of one of the controlling fingers for the upper shelf showing the end of the lever had operated.
Fig. 19 is a view similar to Fig. 18, showing, however a controlling finger for the lower shelf.
Figure 20:
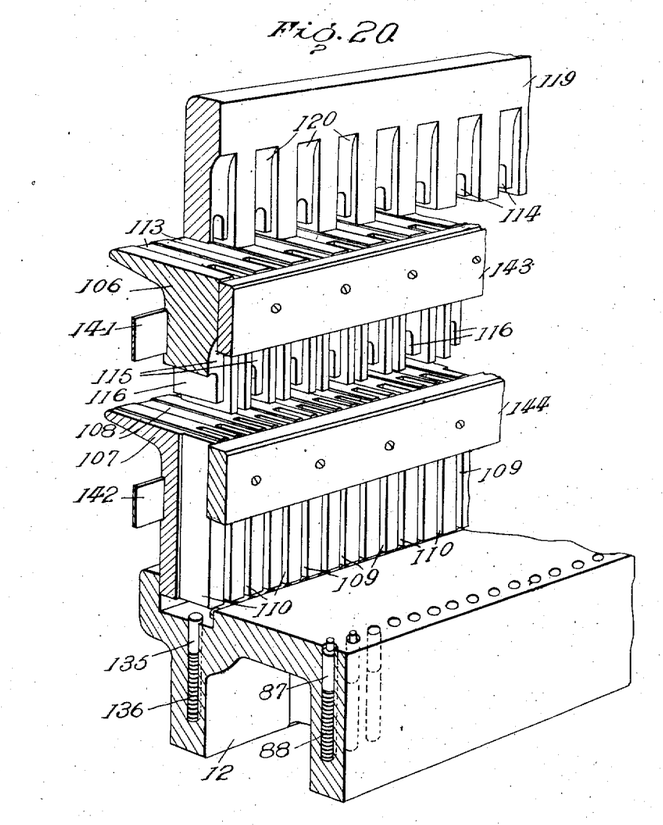
Fig. 20 is a diagrammatic perspective view with parts removed of the two shelves and adjacent parts.

Located in front of the type cases and in position to receive the type ejected therefrom, are the shelves 106 and 107. These shelves are secured at their ends to the front faces of the side frames 3 and 4 and their upper surfaces are so positioned that they will receive the type ejected by the upper and lower series of forcers respectively. These shelves are of the form best shown in Fig. 20 and referring to this figure it will be seen that the lower shelf 107 is provided on its top surface with a series of grooves 108, which when the shelf is in position, are so located as to receive the type ejected by the lower series of forcers. At the rear, the shelf 107 is provided with a series of grooves or channels 109 which extend into the middle of the channels 108, for the purpose to be hereinafter described. Located between these channels 109 is a second series of channels 110 which preferably as is shown, are of the same depth as the channels 109. The shelf 106 is located directly over the shelf 107 and on its upper face is provided with a series of channels 113, similar to the channels 108 of the shelf 107, these channels 113 being in line with the upper series of forcers so that they will receive type ejected thereby. Cut in the back of the shelf 106, are the grooves 114, these grooves entering the channels 113 as shown in Fig. 20 and being in line with the grooves 110 of the shelf 107. In the lower rear edge of the shelf 106 are cut the slots 115 and extending from these slots to the front of the shelf are the slots 116. In the slots 115 and 116 are mounted the adjustable guard pieces 117, these guard pieces 117 are L shaped as best shown in Figs. 4 and 6 and their up-turned portion extends into the slot 115 while their toe portion stands over the channels 108 in the top of the shelf 107.

118 are screws tapped into the up-turned portion of the guards 117, the screws passing through the upper portion of the slots 115 by which the distance between the under faces of the guard and the groove may be adjusted according to the size of type used in the machine. Secured to the side frames 3 and 4 above the shelf 106, is a bar 119 which at its lower edge is provided with the slots 120, similar to the slots 115 in the lower portion of the shelf 106, these slots being so cut that they will stand over the grooves 113 in the top of the shelf 106.

121 are slots cut in the lower face of the bar 119 and extending through to the front of the bar similar to the slots 116 of the shelf 106. In the slots 120 and 121 are mounted the guard pieces 122 similar to the guards 117 and similarly held in an adjustable position by the screws 123. It will be seen that when type are ejected by the upper series of forcers 41, they will enter the grooves 113 of the upper shelf 106 and be held in position in the grooves by the guards 122 and similarly when type are ejected by the lower forcers 52, they will enter the grooves 108 and will be held in position in the grooves by the guards 117.

In order to cause the ejectors to eject a type from its type channel onto the shelf whenever a type is removed, I provide a set of controlling fingers 124 which are located in the grooves 109 of the shelf 107. These controlling fingers extend up through the channels 109 and at their upper end are beveled off at the rear to form a shoulder 125 and in front of the beveled off portion are provided with a shoulder 126. At their lower front edge, they are provided with a projection 127 which extends under the lower end of the shelf and limits the upward movement of the finger.

128 is a slot cut in the rear side of the finger into which extends the end 129 of the levers 86. The slot 128 is longer than the width of the end of the lever so that the controlling fingers can have a movement independent of the levers.

130 are controlling fingers for the upper shelf. These fingers are located in the slots 110 of the lower shelf 107 and the slots 114 of the shelf 106. These fingers have their upper edge beveled at 131 and are provided with a shoulder 132 similar to the upper ends of the fingers 124. The upper ends of the fingers 130 extend into the path of the type ejected onto the shelf 106 by the upper series of forcers 41. These fingers 130 are provided at their lower end with a shoulder 133 which extends under the lower end of the shelf 107 and are also provided with the notches 134 in which the end 82 of the series of levers 79 project. These notches 134, are longer than the width of ends 82 for the same reason as given in connection with the fingers 124. The operation of the upper and lower set of fingers is the same, and I will therefore describe the operation of but a single finger.

Located in the frame 12 are a series of pins 135, pressed forward by the springs 136, there being one of the springs located under each of the fingers 130 and 124. The spring pressed pins tend to hold the fingers in their raised position as shown in Fig. 5, where a type is shown as having been just removed from the upper shelf.

141 and 142 are cards placed in the front face of the tables under the grooves therein, these cards bearing indications of the type lying on the table directly thereover.

The operation of my device is as follows: Supposing the channels of the type case to be filled with type and the case in position in the machine and type in the grooves of the shelves opposite each of the channels. The reciprocating driver 32 will reciprocate back and forth between the two sets of forcers and will not actuate any of the forcers as long as all the type remain upon the shelves. As the operation of the machine is the same whether a type is withdrawn from the upper or lower shelf, I will describe the operation in connection with a withdrawal of a type from the upper shelf. As soon as a type from the upper shelf is withdrawn, the controlling finger 130 which has been held down by the type will move upward under the influence of its spring 136. This will draw up the outer end of the lever 79 connected to it, which in turn will draw down its lock 77, freeing its forcer 41. As soon as the lock 77 has been withdrawn from the notch 74, the forcer so unlocked will be moved forward and given its initial movement by its spring pressed pin 69. This forward movement of the forcer will, because of the cam groove 63, cause the pawl 58 of the forcer to move down and bring its nose 61 into the path of the reciprocating driver 32. The driver by its forward movement will carry the forcer forward and the forcer entering the type case by one of the openings 102, will force the bottom type in the channel out of the case and over the controlling finger 130 into position to be removed by the compositor. As the type is forced outward it passes over the beveled end 131 of the controlling finger 130 and comes to rest over the shoulder 132 of the controlling finger. This will hold the controlling finger down and leave the lever 79 free to move upward under the tension of the spring 88 as soon as the latch 84 can enter the slot 74 of the forcer. As the driver 32 makes 1 return movement, the forward edge comes in contact with the shoulder 64 formed on the forcer and draws the forcer back to its normal position where the lock 77 will enter the slot 74. This return movement of the forcer puts the initial movement mechanism under tension ready to again move the forcer forward as soon as the lock is again released and at the same time the cam groove 63 will by contact with the projection 60 of the pawl 58 withdraw the pawl from the path of the driver. This operation occurs each time a type is removed from either one of the tables by the compositor and, consequently, there is always a full font of type on the tables ready for use.

The object in having the two tables and the type of one channel of the case being ejected onto one table and the type of the adjacent channel being ejected onto the other table, is to provide sufficient space between the adjacent type on the tables to allow the compositor to readily pick the same up and at the same time reduce the width of the machine so as to enable the operator to readily reach all the type.

What I claim as new and desire to secure by Letters Patent is:

1. In a type case, the combination with a type channel, of a forcer, means for maintaining pressure on the forcer to give it an initial movement, a lock restraining the initial movement mechanism, means operated by the removal of the type for releasing the lock and means independent of the initial movement mechanism for actuating the forcer after it has been given its initial movement.

2. In a type case, the combination with a series of type channels, of a series of forcers, means for maintaining pressure on the forcers to give them a movement, a series of independent locks, one for each forcer, restraining the pressure mechanism means operated by the withdrawal of a type for releasing a lock and means for returning the forcers to their normal position.

3. In a type case, the combination with a series of type channels, of a series of forcers, means for maintaining pressure on the forcers to give them an initial movement, a series of independent locks, one for each forcer, restraining the initial movement mechanism, means operated by the withdrawal of a type for releasing the lock and means independent of the initial movement mechanism for actuating the forcers after they have been given their initial movement.

4. In a type case, the combination with a series of type channels, of a series of type forcers one for each channel, means normally held under tension to give the forcers their initial movement, a series of locks normally holding the forcers in their retracted position, means operated by the withdrawal of a type to release a lock and allow the forcer to be given its initial movement, constantly operating means adapted to actuate the forcers when they have been given their initial movement, to eject the type from one of the channels and means on the forcer and actuating mechanism to return the forcer to its retracted position where it is held by the lock.

5. In a type case, the combination with a series of type channels, of a series of forcers one for each channel, a series of locks normally holding the forcers in their retracted position, a spring actuating device for each forcer constantly tending to give the forcer its initial movement, a reciprocating part adapted to engage a forcer when it has been given its initial movement to actuate the forcer to eject a type from a channel, said reciprocating part then operating to return the forcer to its retracted position where it is held by the lock.

6. In a type case, the combination with a type channel, of a forcer, means for maintaining pressure on the forcer to give it an initial movement, a part carried by the forcer and adapted to be moved by the initial movement of the forcer and a constantly operating part adapted to engage the part carried by the forcer when it has been moved by the initial movement of the forcer and operate the forcer.

7. In a type case, the combination with a type channel, of a forcer, means for maintaining pressure on the forcer to give it an initial movement, a pivoted latch carried by the forcer and means adapted to move the latch in relation to the forcer when the forcer is given its initial movement, a constantly operating part adapted to engage the latch when it has been moved by the initial movement of the forcer and operate the forcer.

8. In a type case, the combination with a type channel, of a forcer, means for maintaining pressure on the forcer to give it an initial movement, a latch carried by the forcer and means adapted to move the latch in relation to the forcer when the forcer is given its initial movement, and a constantly operating part adapted to engage the latch when it has been moved by the initial movement of the forcer.

9. In a type case, the combination with a type channel, of a forcer, means for maintaining the pressure on the forcer to give it an initial movement, a latch carried by the forcer, a cam adapted to move the latch in relation to the forcer when the forcer is given its initial movement, and a constantly operating part adapted to engage the latch when it has been moved by the initial movement of the forcer.

10. In a type case, the combination with a type channel, of means for ejecting type from the channel, a shelf in front of the channel onto which the type are ejected, a controlling finger normally extending up into the path of the type on the shelf, connections between the finger and the type ejecting means to cause a type to be ejected onto the shelf when the type on the shelf is removed and continuously operating means for automatically returning the ejecting means to normal position after they have been released.

11. In a type case, the combination with a type channel, of means for ejecting type from the channel, a shelf in front of the channel onto which the type are ejected, a controlling finger extending through the shelf, connections between the finger and the type ejecting means to cause a type to be ejected onto the shelf when the type on the shelf is removed and continuously operating means for automatically returning the ejecting means to normal position after they have been released.

12. In a type case, the combination with a type channel, of means for ejecting type from the channel, a shelf in front of the channel onto which the type are ejected, a spring pressed controlling finger normally extending up into the path of the type on the shelf, connections between the finger and the type ejecting means to cause a type to be ejected onto the shelf when the type on the shelf is removed and continuously operating means for automatically returning the ejecting means to normal position after they have been released.

13. In a type case, the combination with a type channel, of means for ejecting type from the channel, a shelf in front of the channel onto which the type are ejected, a controlling finger having one end in position normally extending into the path of the type on the shelf, connections between the finger and the type ejecting means to cause a type to be ejected onto the shelf when the type on the shelf is removed and continuously operating means for automatically returning the ejecting means to normal position after they have been released.

14. In a type case, the combination with a type channel, of means for ejecting type from the channel, a shelf in front of the channel onto which the type are ejected, a spring pressed controlling finger having one end in position to engage the type on the shelf, said end being beveled to permit the type to pass said finger, connections between the finger and the type ejecting means to cause a type to be ejected onto the shelf when the type on the shelf is removed and continuously operating means for automatically returning the ejecting means to normal position after they have been released.

15. In a type case, the combination with a type channel, of means for ejecting type from the channel, a shelf in front of the channel onto which the type are ejected, a controlling finger having one end in position to engage the type on the shelf said end being provided with a shoulder past which the type pass when ejected and by which they are prevented from returning to the channel and connections between the finger and type ejecting means to cause a type to be ejected onto the shelf when the type on the shelf is removed.

16. In a type case, the combination with a type channel, of means for ejecting type from the channel, a shelf in front of the channel onto which the type are ejected, a controller located between the shelf and the channel with its end in position to engage the rear end of a type on the shelf, and connections between controller and the type ejecting means to cause a type to be ejected onto the shelf when the type on the shelf is withdrawn.

17. In a type case, the combination with a type channel, of means for ejecting type from the channel, a shelf in front of the channel onto which the type are ejected, a spring pressed controlling finger located between the shelf and the channel, having one end with its end in position to engage the rear end of the type on the shelf, and connections between controller and the type ejecting means to cause a type to be ejected onto the shelf when the type on the shelf is withdrawn.

18. In a type case, the combination with a type channel, of means for ejecting type from the channel, a shelf in front of the channel onto which the type are ejected, a spring pressed controlling finger located between the shelf and the channel having one end provided with a shoulder located in position to engage the type on the shelf and hold them in position and connections between controller and the type ejecting means to cause a type to be ejected onto the shelf when the type on the shelf is withdrawn.

19. In a type case, the combination with a type channel, of means for ejecting type from the channel, a shelf in front of the channel onto which the type are ejected, said shelf being provided with a groove of a depth less than the thickness of the type to receive the ejected type and a guard located over the shelf and spaced therefrom to hold the type in position in the groove.

20. In a type case, the combination with a series of type channels, of means for ejecting type from the channels, a pair of shelves arranged at different levels and in front of the channels onto which the type are ejected, each of said shelves being adapted to receive and support type from a plurality of channels.

21. In a type case, the combination with a series of type channels, of means for ejecting type from the channels, a shelf in front of the channels onto which the type are ejected, said shelf being provided with a series of grooves of a depth less than the thickness of the type one in front of each channel and each adapted to receive an ejected type and a series of guards located over the shelf and spaced therefrom to hold the type in the grooves of the shelf.

22. In a type case, the combination with a type channel, of means for ejecting type from the channel, a shelf in front of the channel onto which the type are ejected, said shelf being provided with a groove of a depth less than the thickness of the type to receive the ejected type, and an adjustable guard located over the shelf and spaced therefrom to hold the type in position in the groove.

23. In a type case, the combination with a series of type channels, of means for ejecting type from the channels, a shelf in front of the channels onto which the type are ejected, said shelf being provided with a series of grooves of a depth less than the thickness of the type one in front of each channel and each adapted to receive an ejected type and a series of adjustable guards located over the shelf and spaced therefrom to hold the type in the grooves of the shelf.

24. In a type case, the combination with a series of substantially vertical type channels, of means for ejecting type from the channels at different levels, a shelf for each level at which the type are ejected, to receive and support the type when ejected from the channels and means operated by the removal of a type from the shelf to operate the ejecting means to eject another type into the position from which the type was removed.

25. In a type case, the combination with a series of substantially vertical type channels, of means for ejecting type from the channels at different levels, a shelf for each level at which the type are ejected to receive and support the type when ejected from the channels, guards arranged over the shelves, the guards for one shelf being supported by the shelf above and the guards for the upper shelf being supported by the frame, and means operated by the removal of a type from a shelf to operate the ejecting means to eject another type into the position from which the type was removed.

26. In a type case, the combination with a series of substantially vertical type channels of equal length a plurality of shelves located at different levels and removable supports located in the lower ends of some of the channels to support the type in these channels at a different level from the type in the other channels with the lower type in each channel in line with a shelf.

27. In a type case, the combination of a type container consisting of a back plate arranged substantially vertical and a plurality of strips extending longitudinally of the back plate and forming a series of channels, a series of openings through the back plate arranged in different planes supports located in the lower ends of some of the channels to support the type in these channels at a different level from the type in the other channels and means operating through the openings to eject type from the channels whereby the type from some channels will be ejected at a different level from the type of the other channels.

28. In a type case, the combination with a type container arranged substantially vertical and provided with a series of longitudinal channels, means for supporting type in the channels so that the lower most type in some channels will be at a different level from the lower most type in the other channels a pair of shelves one of said shelves being located in line with the lower most type in one set of channels and the other shelf in line with the other set of channels and means for ejecting the lower most type of either set of channels.

29. The combination with a series of type channels, of two series of forcers arranged in different planes and adapted to eject type from the channels at two levels, constantly operating means located between the two sets of forcers and means carried by the forcers and adapted to be brought into engagement with the constantly operating means whereby the forcers will be operated.

Signed by me at Washington, District of Columbia this fifteenth day of November, 1904.

ALEXANDER DOW.

Witnesses:
ESTELLE E. WARFIELD,
FRANCIS M. PHELPS.